United States Patent [19]

Pasquali et al.

[11] Patent Number: 4,920,865
[45] Date of Patent: May 1, 1990

[54] DEVICE FOR EXTRACTING AIR FROM AN AUTOMOBILE INTERIOR

[75] Inventors: Renato Pasquali, Garbagnate; Luigi Verga, Vertemate Con Minoprio; Franco Mendicino, Arese, all of Italy

[73] Assignee: Alfa Lancia Industriale S.p.A., Arese, Italy

[21] Appl. No.: 234,746

[22] Filed: Aug. 22, 1988

[30] Foreign Application Priority Data

Sep. 4, 1987 [IT] Italy ................ 22266/87[U]

[51] Int. Cl.⁵ .................................................. B60H 1/26
[52] U.S. Cl. ................................................... 98/2.18
[58] Field of Search ................ 98/2.18, 19, 20, 119; 137/512.15, 855

[56] References Cited

U.S. PATENT DOCUMENTS

| | | | |
|---|---|---|---|
| 2,094,800 | 10/1937 | Lintern | 98/19 X |
| 2,248,329 | 7/1941 | Bell | |
| 2,378,613 | 6/1945 | Young et al. | 137/855 |
| 3,391,628 | 7/1968 | Ziegenfelder | 98/2.18 |
| 4,567,816 | 2/1986 | Kolt | 137/512.15 X |
| 4,667,578 | 5/1987 | Hagenah | 98/2.18 |

FOREIGN PATENT DOCUMENTS 1763725 5/1957 Fed. Rep. of Germany .
1464149 11/1966 France .

*Primary Examiner*—Harold Joyce
*Attorney, Agent, or Firm*—Charles E. Brown; Charles A. Brown

[57] ABSTRACT

A device for extracting to atmosphere the air from the interior of an automobile passenger compartment, comprising at least one air outlet aperture (12) provided in a wall (11) of the luggage compartment (10), and at least one non-return valve (14) engaged with said aperture (12), said valve (14) formed from a framework (16) comprising a grid (19) and a casing (18), and from a diaphragm (20) which is rotatably supported in the casing of the framework and which, when in the rest state, adheres to the grid (19). The framework (16) is mounted in the aperture (12) in the wall (11) of the luggage compartment (10), with the framework (18) and grid (19) disposed mainly within the interior of the luggage compartment (10).

5 Claims, 2 Drawing Sheets

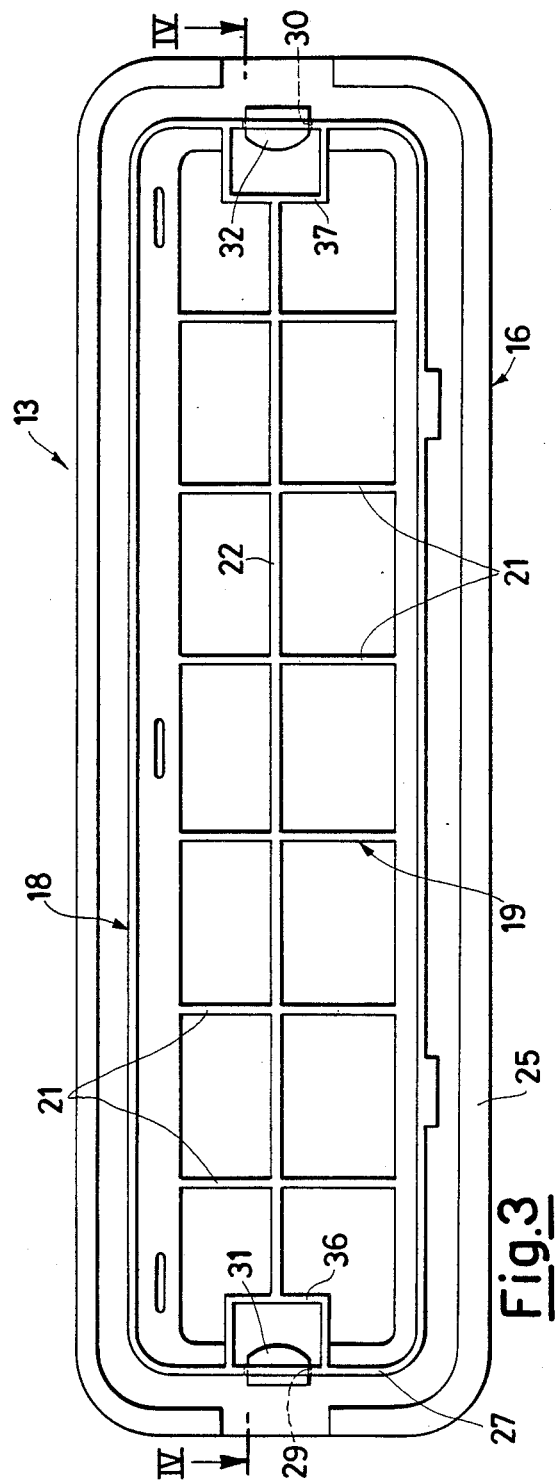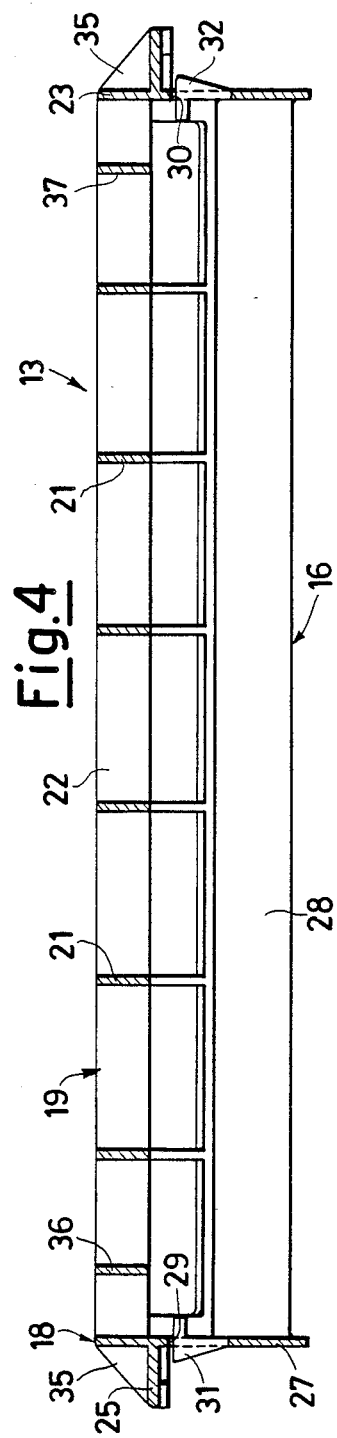

DEVICE FOR EXTRACTING AIR FROM AN AUTOMOBILE INTERIOR

This invention relates to a device for extracting air from the interior of an automobile passenger compartment, and particularly a device able to discharge stale air to the outside through apertures situated in the automobile tail.

Automobile passenger compartment ventilation system of the so-called closed window type are known to be particularly comfortable because they enable air to be fed into and extracted from the passenger compartment without opening the windows.

The passengers are therefore protected from noise, wind and dust, while the passenger compartment interior remains ventilated. Generally in these systems, the external air enters the passenger compartment through ducting and ports which are positioned in the dashboard and possibly in the doors, and are fed by air intakes situated in regions which when the automobile is running are under pressure, so employing a dynamic ventilation effect.

In these systems, the stale air is discharged to the outside through apertures situated in the rear uprights, in the rear window frame or in the automobile tail, and in any event in regions which when the automobile is running are under vacuum so that the air is extracted from the passenger compartment by the air stream flowing around the automobile.

One of the tasks of the described ventilation is to discharge stale air to the outside in the quantity necessary to balance the internal pressure with the external pressure, so as to limit the internal pressure level.

A further task of such ventilation system is to remove air from the passenger compartment interior and continuously discharge the stale air without creating annoying draughts.

Consequently in designing ventilation system, the tendency is to position the air extraction apertures in regions which are as distant as possible from those in which the head and upper body of the automobile occupants are located.

In some cases, the air extraction apertures are provided in the side walls of the luggage compartment in regions lying below and covered by the lateral extension of the rear bumper, so that they are not visible.

Generally, non-return valves are disposed in said apertures to allow air to flow outwards while preventing air entering inwards. These valves comprise a grid-shaped framework and a diaphragm flap, which is rotatably by the framework casing and which, when in the rest state, adheres to the grid.

Usually the framework is fixed into the aperture in the luggage compartment wall by mounting it from the outside, so that it becomes positioned between this wall and the bumper.

A device of this type is described in U.S. Pat. No. 4,667,578, in which the framework is also provided with a fin arranged to tightly close the space between the luggage compartment wall and bumper in order to prevent entry of dust, dirt and water thrown by the wheels.

The object of the present invention is to improve known devices by providing a framework which can be inserted into the aperture in the luggage compartment wall from the inside of the luggage compartment itself, and which after mounting is located mainly within the interior of the luggage compartment so that it lies in a region which is more protected from atmospheric agents and also from possible impact due to bumper deformation.

The invention provides an air extractor device comprising at least one air outlet aperture provided in a wall of the luggage compartment, and at least one non-return valve engaged with said aperture, said valve formed from a framework comprising a grid and a casing, and from a diaphragm which is rotatably supported in the casing of said framework and which, when in the rest state, adheres to said grid, the device being characterised in that said framework is mounted in said aperture in the luggage compartment wall, with the framework and grid disposed mainly within the luggage compartment interior.

According to a preferred embodiment, the framework casing has an inner rim, an inner flange and an outer rim, said grid being supported mainly by said inner rim and flange.

Again according to a preferred embodiment, the outer rim of the casing is provided with elastically deformable L-shaped clips for gripping the luggage compartment wall.

Characteristics and advantages of the invention are illustrated hereinafter with reference to FIGS. 1 to 4, which show a preferred embodiment of the invention by way of non-limiting example.

FIG. 3 is a rear view of a component of the device of FIG. 2.

FIG. 4 is a section on the line IV-IV of FIG. 3.

Figure 1:
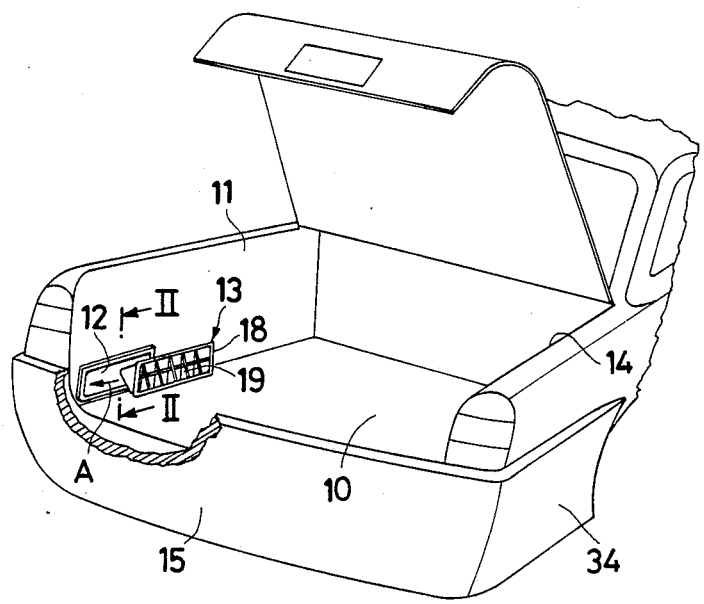
FIG. 1 is a prospective view of an automobile luggage compartment provided with an air extractor device constructed in accordance with the invention.

In FIG. 1, the reference numeral 10 indicates an automobile luggage compartment, in the side wall 11 of which there is provided an aperture 12 into which a non-return valve indicated overall by 13 is inserted in the direction of the arrow A. An aperture identical to the aperture 12 and provided with a relative non-return valve can be also provided in the side wall 14 of the luggage compartment.

The luggage compartment 10 communicates with the automobile passenger compartment by way of pots, not shown. In FIG. 1 to rear bumper is indicated by 15. As can be also seen from FIGS. 2, 3 and 4, the valve 13 is formed from a framework indicated overall by 16 and comprising a casing 18 and grid 19, and from a diaphragm 20 formed from a thin flap of flexible material such as rubber.

The grid 19 is formed from substantially triangular vertical bars indicated by 21 and a horizontal bar 22 which intersects them and terminates in two U-shaped portions 36 and 37, visible in FIG. 3. The casing 18 has an inner rim 23, onto the upper side of which lugs 24 forming part of the diaphragm 20 are fixed by means of press studs 33. The casing 18 has a flange 25 provided with a seat for a gasket 26 which seals against the inner surface of the wall 11, and is also provided with an outer rim 27 which in this particular case extends to form a port 28 for conveying the air to the outside. Between the rim 23 and flange 25 there are provided triangular reinforcement webs indicated by 35.

Figure 2:
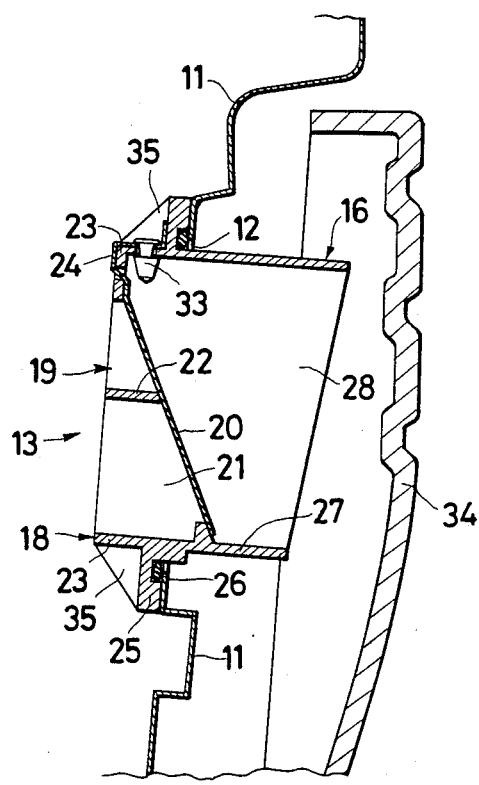
FIG. 2 is an enlarged partial section one the line II-II of FIG. 1.

Two elastic L-shaped clips 31 and 32, shown in FIGS. 3 and 4, are rigid with the vertical walls of the rim 27. The clips are located in apertures 29 and 30 provided in the walls of the rim 27, they being visible in FIG. 3. In FIG. 2 the lateral extension 34 of the bumper 15 is partly visible.

When the diaphragm 20 is in its rest state it adheres to the grid 19, whereas it rises upwards as shown in FIG. 2 when a positive pressure difference between the interior of the compartment 10 and atmosphere, exists, to allow air to flow to the outside.

The framework 16 is inserted from the interior of the compartment 10 into the aperture 12 where it is retained by the snap action of the clips 31 and 32 which engage in the apertures 12. Thus if required it can also be demounted.

As can be seen from FIGS. 1 and 2, the casing 18 and grid 19 are located mainly within the compartment 10, and are therefore sufficiently protected from atmospheric agents and from any impact due to deformation of the lateral extension 34 of the bumper 15. Moreover, the framework 16 is prevented from hindering the assembly of the bumper 15 or, rather, interfering with its lateral extension 34.

The operation of the diaphragm 20 could be prejudiced by any deposits of dirt on the framework 16, in which case when in the rest state it would not lie perfectly in contact with grid 19 and would not reliably close the aperture 12.

It is therefore possible to provide partial closure of the automobile lower region or underbody, by providing the lateral extensions of the bumpers 15 with walls which are inwardly directed and possibly fixed to the underbody sheet metal.

We claim:

1. A device for extracting to atmosphere the air from the interior of an automobile passenger compartment, said device comprising at least one air outlet aperture (12) being provided in a wall (11) of a luggage compartment (10) of the automobile, and at least one non-return valve (13) engaged with said aperture (12), said valve (13) having a framework (16) which comprises a grid (19) and a casing (18), said grid (19) having a first side facing the interior of the luggage compartment and a second side opposing said first side and a diaphragm (20) which is rotatably supported in the casing of said framework and which, when in the rest state, adheres to said second side of said grid (19), said framework (18) and grid (19) being disposed mainly within the interior of the luggage compartment (10), said casing (18) comprising an inner rim (23), an inner flange (25) and an outer rim (27), said grid being supported mainly by said inner rim (23) and flange (25), said diaphragm (20) having a plurality of lugs (24), the lugs (24) being arranged to overlap the inner rim (23) of said casing (18), the lugs (24) being fixed to the inner rim (23) by press studs (33) each which are pressed through an opening in the lugs (24) and an opening in the inner rim (23) whereby said diaphragm (20) has a portion thereof extending through said grid (19).

2. A device as claimed in claim 1, wherein said outer rim (27) is provided with elastically deformable L-shaped clips (31, 32) for gripping the luggage compartment wall (11).

3. A device as claimed in claim 1, wherein said flange (25) is provided with a seat for a gasket (26) able to seal against an inner surface of said luggage compartment wall (11).

4. A device as claimed in claim 1, wherein said grid (19) is formed from substantially triangular vertical bars (21) and at least one horizontal bar (22) which intersects said vertical bars.

5. A device as claimed in claim 1, wherein the outer rim (27) extends to form a port (28) for conveying air to the outside.

* * * * *